United States Patent [19]

Maresca

[11] Patent Number: 4,710,562

[45] Date of Patent: Dec. 1, 1987

[54] STABILIZING POLYARYLETHERKETONES

[75] Inventor: Louis M. Maresca, Belle Mead, N.J.

[73] Assignee: Amoco Corporation, Chicago, Ill.

[21] Appl. No.: 867,619

[22] Filed: May 27, 1986

Related U.S. Application Data

[63] Continuation of Ser. No. 710,118, Mar. 11, 1985, abandoned.

[51] Int. Cl.$^4$ .................. C08G 8/02; C08G 14/00
[52] U.S. Cl. .................................. 528/125; 525/390;
525/397; 525/471; 528/126; 528/128; 528/174;
528/175; 528/176; 528/179; 528/180; 528/181;
528/182; 528/193; 528/194
[58] Field of Search .............. 528/125, 126, 128, 174,
528/175, 176, 179, 180, 181, 182, 193, 194;
525/390, 397, 471

[56] References Cited

U.S. PATENT DOCUMENTS

| | | | |
|---|---|---|---|
| 3,956,240 | 5/1976 | Dahl et al. | 528/125 |
| 4,229,564 | 10/1980 | Dahl | 528/125 |
| 4,239,884 | 12/1980 | Dahl | 528/125 |
| 4,247,682 | 1/1981 | Dahl | 528/175 |
| 4,296,217 | 10/1981 | Stuart-Webb | 528/125 |

*Primary Examiner*—Lucille M. Phynes
*Attorney, Agent, or Firm*—Donald M. Papuga; William H. Magidson; Ralph C. Medhurst

[57] ABSTRACT

Described herein is a process for stabilizing a poly(aryl ether ketone) produced by a Friedel-Crafts polymerization process which comprises adding a nucleophilic and/or an electrophilic capping agent during the polymerization.

9 Claims, No Drawings

STABILIZING POLYARYLETHERKETONES

This application is a continuation of prior U.S. application Ser. No. 710,118, filing date 3-11-85, now abandoned.

TECHNICAL FIELD

This invention is directed to a method of stabilizing poly(aryl ether ketones) by reacting a nucleophilic coreactant with an electrophilic coreactant under heterogeneous Friedel-Crafts polymerization conditions by adding a nucleophilic and/or electrophilic capping agent during the polymerization.

BACKGROUND OF THE INVENTION

Polyketones derived from diphenyl ether and terephthaloyl and isophthaloyl chlorides by Friedel-Crafts synthesis are known from, for example, U.S. Pat. Nos. 3,065,205; 3,441,538; 3,442,857; 3,516,966; 3,637,592; 3,666,612; 3,767,620. These polyketones possess desirable and useful chemical and physical properties. In this regard, U.S. Pat. No. 3,767,620 states the following in column 1, lines 23 to 28:

> "Their good electrical properties, coupled with resistance to thermal oxidative and hydrolytic degradation, made them good candidates for electrical insulation, but these polymers tend to degrade and undergo decomposition during attempts to extrude them."

U.S. Pat. No. 3,767,620 attributes the melt instability of the polyketones produced by Friedel-Crafts polymerization to a high percentage of 9-phenylenexanthydrol end groups. The chemical reduction of 9-phenylenexanthydrol end groups to the corresponding 9-phenylenexanthene groups is stated in the patent to provide a polyketone with improved thermal stability after the reduction.

U.S. Pat. No. 4,247,682 describes polyarylketones and polyaryl sulfones having good melt stability. These polymers are prepared by a Friedel-Crafts condensation polymerization. The polymerization is carried out in solution and is homogenous. The patent states the following in column 1, lines 48 to 64:

> "However, I have now discovered that when the terminal group on either or both ends of each polymer chain is a phenoxy (or other nucleophilic) moiety having a para position available for reaction then, in highly acid media such as hydrogen fluoride/boron fluoride mixtures, a preferred polymerization reaction media, another heretofore unknown branching reaction occurs. It is believed that such branching results from the reaction of the phenoxy (or other nucleophilic) groups (presumably activated, i.e., protonated by the acid media) with carbonyl groups in the polymer itself leading, I believe, to the formation of trisaryl carbonium salts. In addition to the deleterious effect of branching per se on processability, such salts are thermally very unstable and lead to degradation and discoloration in the polymer when molten".

The polymers in U.S. Pat. No. 4,247,682 are capped at each end by a nucleophilic or electrophilic capping agent. The nucleophilic capping agents are described as having the general formula:

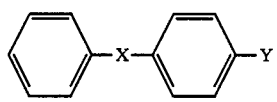

where X is preferably —O— or a covalent bond and Y is CN and $NO_2$. The electrophilic capping agents are described as having the general formula Ar"COZ or AR"$SO_2$Z with Z being OH, halogen or OR where R is alkyl, and Ar" being phenyl, etc., either unsubstituted or substituted with one or more electron withdrawing substituents such as halogen, nitro or cyano.

However, the polymerization in U.S. Pat. No. 4,247,682 is carried out in anhydrous hydrogen fluoride with boron trifluoride as the catalyst and is thus a homogeneous process. Further, the double end capping is carried out in hydrogen fluoride solution.

THE INVENTION

The present invention is directed to a process for stabilizing a poly(aryl ether ketone) by reacting a nucleophilic coreactant with an electrophilic coreactant under heterogeneous Friedel-Crafts polymerization conditions by adding a nucleophilic and/or an electrophilic capping agent during the polymerization.

The polymerization process of this invention is a heterogeneous process in that the poly(aryl ether ketone) begins to precipitate when it is formed. The poly(aryl ether ketone) of this invention is stabilized by end capping utilizing an electrophilic and/or nucleophilic capping agent. It is unexpected that the poly(aryl ether ketone) in the form of a precipitate could be stabilized, since the prior art describes stabilizing polyketones while they are in solution. It is additionally unexpected that a poly(aryl ether ketone) could be stabilized using a double end capping procedure since a heterogeneous reaction is more difficult to control than a homogeneous reaction.

For purposes of illustration the reaction of terephthaloyl chloride and diphenyl ether to produce a poly(aryl ether ketone) will be used. The reaction is the following:

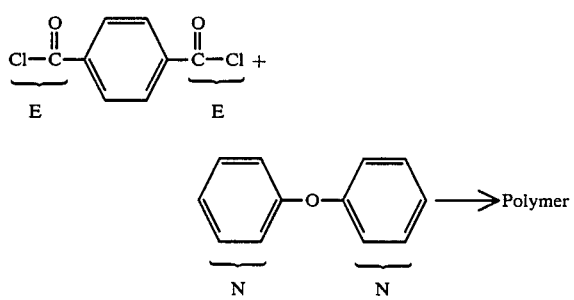

where E stands for an electrophile and N for a nucleophile.

Three situations are possible for end capping the polymer depending upon the amounts and types of starting reactants, i.e., if there is an excess of the electrophile, an excess of the nucleophile or equimolar quantities of each. These situations are as follows:

Situation I excess E—E+N—N→E—E—E—E

The polymer has an electrophilic group attached to both ends. Thus, a nucleophilic capping agent would be added in amounts of twice the excess of electrophile, i.e., excess E—E+N—+2(excess E—E)N'→'N—E—E
E—E—N'

Situation II

E—E+excess N—N→N—N—N—N

The polymer has a nucleophilic group attached to both ends. Thus, an electrophilic capping agent would be added in amounts of twice the excess of nucleophile, i.e.:

E—E+excess N—N+2(excess N—N)E'→'E—N—N—N—E'

Situation III

1E—E+1N—N→E—E—N—N

Since equimolar amounts of electrophilic and nucleophilic reactants have been added, one end of the polymer has an electrophile and the other a nucleophile. Thus, both a nucleophilic and electrophilic capping agent would be added in equal amounts, i.e.,

E—E+N—N+N'+E'→'N—E—E→N—N—E'

Situation III also applies when the reactant has the structure of N—E.

The nucleophilic capping agents N' are of the general formula:

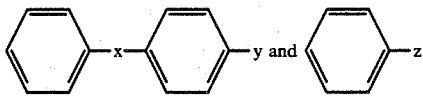

wherein x is a covalent bond, —O—, —S—, or —CR$_2$— wherein each R is independently hydrogen, an alkyl or fluoroalkyl group, preferably of 1 to 10 carbons, phenyl or an electron withdrawing group substituted phenyl. Preferably, x is a covalent bond, y is NO$_2$,

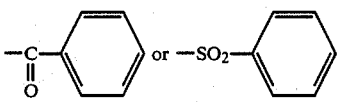

or if x is a covalent bond, y can also be hydrogen as well as any of the foregoing, z is halogen, alkyl or alkoxy Specific examples of appropriate nucleophilic capping agents are 4—nitrodiphenyl ether
4—phenoxybenzophenone
4—phenoxydiphenyl sulfone
anisole
fluorobenzene
chlorobenzene
biphenyl
toluene.

Electrophilic capping agents (E') correspond to the formula

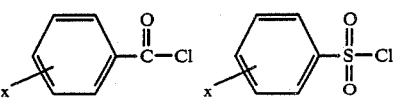

where x=halogen, alkyl, alkoxy, nitro,

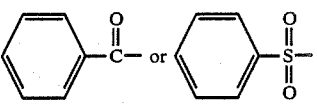

Specific examples of these end capping agents include the following benzoyl chloride
p-fluorobenzoyl chloride
p-chlorobenzoyl chloride
p-methoxybenzoyl chloride
benzene sulfonyl chloride
p-chlorobenzene sulfonyl chloride
p-methylbenzene sulfonyl chloride
4-benzoyl-benzoyl chloride The capping agents may be added anytime during or after the polymerization reaction but preferably are added with the reactants at the beginning of the polymerization reaction.

The poly(aryl ether ketones) which are suitable for use in this invention are those which are prepared by Friedel-Crafts condensation polymerization.

The polyketones may be prepared by reacting:
(a) a mixture of substantially equimolar amounts of
  (i) at least one electrophilic aromatic diacyl halide of the formula YOC—Ar—COY where —Ar— is a divalent aromatic radical such as phenylene, diphenylether-4,4'-diyl, diphenyl-4,4'-diyl, naphthalene, and the like, Y is halogen such as chlorine, bromine or iodine with chlorine being preferred, and COY is an aromatically bound acyl halide group, which diacyl halide is polymerizable with at least one aromatic compound of (a)(ii), and (ii) at least one aromatic nucleophilic compound of the formula H—Ar'—H where —Ar'— is divalent aromatic radical such as diphenylether-4,4'-diyl, 2,7-dibenzofurandiyl, diphenyl-4,4'-diyl, diphenylmethane-4,4'-diyl, and the like, and H is an aromatically bound hydrogen atom, which compound is polymerizable with at least one diacyl halide of (a)(i), and (b) at least one aromatic monoacyl halide of formula H—Ar"—COY where —Ar"— is a divalent aromatic radical such as diphenylether-4,4'-diyl, 2,7-dibenzofurandiyl, diphenyl-4,4'-diyl, diphenylmethane-4,4'-diyl, and the like and H is an aromatically bound hydrogen atom, Y is as defined above, and COY is an aromatically bound acyl halide group, which monoacyl halide is self-polymerizable, and (c) a combination of (a) and (b).

Specifically, the polyketones may be prepared by reacting any of the well-known aromatic nucleophilic coreactants such as diphenyl sulfide, dibenzofuran, thianthrene, phenoxathin, dibenzodioxine, phenodioxin, diphenylene, 4,4'-diphenoxybiphenyl, xanthone, 2,2'-diphenoxybiphenyl, 1,2-diphenoxybenzene, 1,3-diphenoxybenzene, 1-phenoxynaphthalene, 1,2-diphenoxynaphthalene, diphenyl ether, 1,5-diphenoxynaphthalene and the like.

Similarly, the following electrophilic aromatic coreactant candidates may be mentioned: terephthaloyl chloride, isophthaloyl chloride, thio-bis(4,4'-benzoyl chloride), benzophenone-4,4'-di(carbonyl chloride), oxy-bis(3,3'-benzoyl chloride), diphenyl-3,3'-di(carbonyl chloride), carbonyl-bis(3,3'-benzoyl chloride), sulfonyl-bis(4,4'-benzoyl chloride), sulfonyl-bis(3,3'-benzoyl chloride), sulfonyl-bis(3,4'-benzoyl chloride), thio-bis(3,4'-benzoyl chloride), thio-bis(4,4'-benzoyl chloride), diphenyl-3,4'-di(carbonyl chloride), oxy-bis[4,4'-(2-chlorobenzoyl chloride)], naphthalene-1,6-di(carbonyl chloride), naphthalene-,5-(carbonyl chloride), naphthalene-2,6-di(carbonyl chloride), oxy-bis[7,7'-naphthalene-2,2'-di(carbonyl chloride)], thio-bis[8,8'-naphthalene-1,1'-di(carbonyl chloride)], [7,7'-binaphthyl-2,2'-di(carbonyl chloride)], diphenyl-4,4'-di(carbonyl chloride), carbonyl-bis[7,7'-naphthalene-2,2'-di(carbonyl chloride)], sulfonyl-bis[6,6'-naphthalene-,2'-di(carbonyl chloride)], dibenzofuran-2,7-di(carbonyl choride) and the like.

In addition to the electrophilic aromatic coreactants, carbonyl chloride (phosgene), carbonyl bromide, carbonyl fluoride, or oxaloyl chloride.

Examples of compounds corresponding to the formula H—Ar"COY include p-phenoxybenzoyl chloride, p-biphenyloxybenzoyl chloride, 4-(p-phenoxyphenyl)-benzoyl chloride, 4-(p-phenoxybenzoyl)benzoyl chloride, 4-(p-phenoxyphenoxy)benzoyl chloride, 3-chlorocarbonyl dibenzofuran, 1-naphthoyl chloride, 2-naphthoyl chloride, and the like.

Preferably, diphenyl ether is reacted with terephthaloyl chloride and/or isophthaloyl chloride.

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide and stannic chloride, can also be used.

The polymerization is generally carried out in the presence of a solvent. The preferred organic solvent is 1,2-dichloroethane as described in U.S. patent application Ser. No. 710,119 filed 3/11/87 filed in the names of L. M. Maresca et al. titled "An Improved Process For Preparing Poly(aryl ether ketones)", filed on the same date as this application and commonly assigned. In said application an improved process for preparing poly(aryl ether ketones) by reacting nucleophilic coreactants with electrophilic coreactants under Friedel-Crafts polymerization conditions is described. The improvement comprises carrying out the polymerization in a solvent comprising 1,2-dichloroethane.

The coreactants and catalyst, such as aluminum chloride, are soluble in 1,2-dichloroethane. The polymer precipitates out of solution at an early stage and continues to polymerize in suspension. Other solvents such as symmetrical tetrachloroethane, o-dichlorobenzene or carbon disulfide are useful.

The reaction may be carried out over a range of temperatures which are from about 0° C. to about 160° C. In general, it is preferred to carry out the reaction at a temperature in the range of 0° to 30° C. In some cases it is advantageous to carry out the reaction at temperatures above 30° C. or below 0° C. The reaction is generally carried out under atmospheric pressure. However, higher or lower pressures may also be used.

The polymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The polymers of this invention will be fabricated into any desired shape, i.e., moldings, coatings, films, or fibers. They are particularly desirable for use as electrical insulation for electrical conductors.

EXAMPLES

The following examples serve to give specific illustrations of the practice of this invention but they are not intended in any way to limit the scope of this invention.

Control A

A 2 liter, three neck, round bottom flask was equipped with a mechanical stirrer, condenser, nitrogen inlet and thermometer. Into the flask were charged 18.27 g (0.090 moles) of terephthaloyl chloride, 2.03 g (0.010 moles) of isophthaloyl chloride, 17.01 g (0.100 moles) of diphenyl ether and 700 moles of 1,2-dichloroethane. The solution was cooled in an ice water bath to 5° C. Aluminum chloride (34.67 g, 0.260 moles) was added in portions while maintaining the temperature below 10° C. The resulting reaction mixture was kept at between 5° and 10° C. for 6 hours. After $\approx$30 minutes a precipitate formed. At the end of 6 hours the ice bath was removed and the reaction mixture was allowed to warm to ambient temperature ($\approx$25° C.) and react for an additional 16 hours. The reaction mixture was poured into 3 liters of ice water containing 100 ml of concentrated hydrochloric acid. The resulting 3 phase mixture was heated to $\approx$85° C. to distill the 1,2-dichloroethane. The polymer was isolated by filtration, washed with water (2 times using 500 ml), methanol (2 times using 500 ml) and dried in a vacuum oven at 100° C. The product had a reduced viscosity of 0.95 dl/g as measured in concentrated sulfuric acid at 25° C. and at a concentration of 1 g/100 ml. After 10 minutes at 400° C. in a Tinus Olsen Extrusion Plastometer (melt indexer) the polymer exhibited zero flow.

Control B

The general procedure described in Control A was repeated on a larger scale with the following charge:
71.05 g (0.350 moles) of terephthaloyl chloride,
30.45 g (0.150 moles) of isophthaloyl chloride,
85.95 g (0.505 moles) of diphenyl ether,
3500 mls of 1,2-dichloroethane, and
173.35 g (1.30 moles) of aluminum chloride The resulting polymer had a reduced viscosity of 1.31 dl/g as measured in concentrated sulfuric acid at 25° C. and at a concentration of 1 g/100 ml. Despite end cap-

EXAMPLE 1

Into the apparatus described in Control A where charged 18.27 g (0.090 moles) of terephthaloyl chloride, 2.03 g (0.010 moles) of isophthaloyl chloride, 17.09 g (0.1005 moles) of diphenyl ether, 0.14 g (0.0010 moles) of benzoyl chloride and 700 mls of 1,2 dichloroethane. After cooling the solution to 5° C., aluminum chloride (34.67 g, 0.26 moles) was added portionwise while maintaining the temperature at below 10° C. A precipitate formed ≈30 minutes after the addition of aluminum chloride was completed. The remaining reaction and isolation steps were the same as in Comparative Example A. The resulting polymer had a reduced viscosity of 0.99 dl/g as measured in concentrated sulfuric acid at 25° C. at a concentration of 1 g/100 ml. After 10 and 30 minutes at 400° C. in the Tinus Olsen Plastometer the polymer had a melt flow of 18 dg/min and 7 dg/min respectively.

EXAMPLE 2

Example 1 was repeated with the following charge:
18.27 g (0.090 moles) of terephthaloyl chloride,
2.03 g (0.010 moles) of isophthaloyl chloride,
17.05 g (0.1003 moles) of diphenyl ether,
0.0849 g (0.0006 moles) of benzoyl chloride,
700 ml of 1,2 dichloroethane, and
34.67 g (0.260 moles) of aluminum chloride The resulting polymer had a reduced viscosity of 1.14 dl/g as measured in concentrated sulfuric acid at 25° C. and a concentration of 1 g/100 ml. The melt flow of the polymer after 10 minutes at 400° C. in the melt indexer was 0.88 dg/min. After 30 minutes it was 0.28 dg/min.

EXAMPLE 3

Example 1 was repeated with the following charge:
14.21 g (0.070 moles) of terephthaloyl chloride,
6.09 g (0.030 moles) of isophthaloyl chloride,
17.18 g (0.101 moles) of diphenyl ether, 0.29 g (0.002 moles) of benzoyl chloride,
700 ml of 1,2 dichloroethane, and
34.67 g (0.240 moles) of aluminum chloride.

The resulting polymer had a reduced viscosity of 0.78 dl/g as measured in concentrated sulfuric acid at 25° C. and at a concentration of 1 g/100 ml. The melt flow of the polymer at 400° C. for 10 and 30 minutes in the melt indexer was 24 dg/min and 29 dg/min respectively.

EXAMPLE 4

Example 1 was repeated with the following charge:
18.45 g (0.091 moles) of terephthaloyl chloride,
2.05 g (0.010 moles) of isophthaloyl chloride,
17.01 g (0.100 moles) of diphenyl ether,
0.22 g (0.002 moles) anisole,
700 ml of 1,2 dichloroethane, and
34.67 g (0.26 moles) of aluminum chloride.

The resulting polymer had a reduced viscosity of 1.20 dl/g as measured in concentrated sulfuric acid at 25° C. and at a concentration of 1 g/100 ml. At 400° C. for 10 and 30 minutes the melt flow of the polymer, measured in a Tinus Olsen Plastometer, was 7.69 dg/min and 1.72 dg/min respectively.

EXAMPLE 5

Example 1 was repeated with the following charge:
18.27 g (0.090 moles) of terephthaloyl chloride,
2.03 g (0.010 moles) of isophthaloyl chloride,
17.01 g (0.100 moles) of diphenyl ether,
0.14 g (0.001 moles) of benzoyl chloride,
0.15 g (0.001 moles) of biphenyl,
700 ml of 1,2 dichloroethane, and
34.67 g (0.260 moles) of aluminum chloride.

The resulting polymer had a reduced viscosity of 1.08 as measured in concentrated sulfuric acid at 25° C. at a concentration of 1 g/100 ml. At 400° C. for 10 minutes in a Tinus Olsen Extrusion Plastometer the polymer had a melt flow of 0.38 dg/min. After 30 minutes it was 0.18 dg/min.

What is claimed is:

1. A method of stabilizing poly(aryl ether ketones) produced by reacting a nucleophilic coreactant with an electrophilic coreactant under heterogeneous polymerization conditions in the presence of a Friedel-Crafts catalyst at a temperature of from about 0° to about 160° C. in an organic solvent, which comprises adding a nucleophilic and/or an electrophilic capping agent during the polymerization, said nucleophilic capping agent being of the following formula:

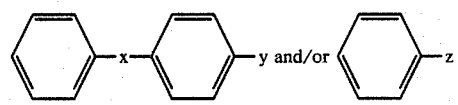

wherein x is a covalent bond, —O—, —S—, or —CR$_2$—, wherein each R is independently hydrogen, C$_1$ to C$_{10}$ alkyl, C$_1$ to C$_{10}$ fluoroalkyl, phenyl or an electron withdrawing group substituted phenyl, y is NO$_2$,

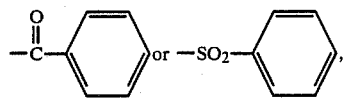

and z is halogen, alkyl or alkoxy; said electrophilic capping agent being of the following formula:

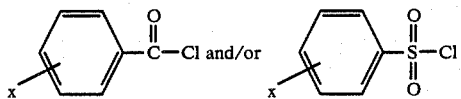

wherein x is halogen, alkyl, alkoxy, nitro,

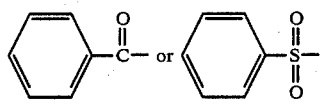

2. A method as defined in claim 1 wherein x is 0.
3. A method as defined in claim 1 wherein x is a covalent bond, y is NO$_2$,

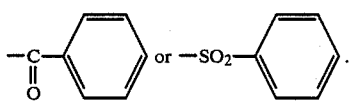

4. A method as defined in claim 1 wherein z is fluoro or chloro.

5. A method as defined in claim 1 wherein the nucleophilic capping agents are selected from:
4—nitrodiphenyl ether
4—phenoxybenzophenone
4—phenoxydiphenyl sulfone
anisole
fluorobenzene
chlorobenzene
biphenyl
toluene.

6. A method as defined in claim 1 wherein the electrophilic capping agents are selected from:
benzoyl chloride
p-fluorobenzoyl chloride
p-chlorobenzoyl chloride
p-methoxybenzoyl chloride
benzene sulfonyl chloride
p-chlorobenzene sulfonyl chloride
p-methylbenzene sulfonyl chloride
4-benzoyl-benzoyl chloride.

7. A method as defined in claim 1 wherein the poly(aryl ether ketone) is prepared by reacting diphenyl ether with terephthaloyl chloride and/or isophthaloyl chloride.

8. A method for stabilizing poly(aryl ether ketones) produced by reacting a nucleophilic coreactant with an electrophilic coreactant under heterogeneous polymerization conditions in the presence of a Friedel-Crafts catalyst at a temperature of from about 0° to about 30° C. in a solvent comprising 1,2-dichloroethane, which comprises adding a nucleophilic and/or an electrophilic capping agent during the polymerization, said nucleophilic capping agent being of the following formula:

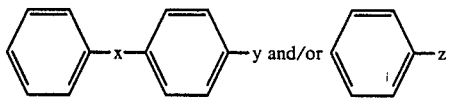

wherein x is a covalent bond, —O—, —S—, or —CR$_2$—, wherein each R is independently hydrogen, C$_1$ to C$_{10}$ alkyl, C$_1$ to C$_{10}$ fluoroalkyl, phenyl or an electron withdrawing group substituted phenyl, y is NO$_2$,

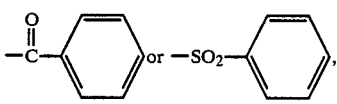

and z is halogen, alkyl or alkoxy; said electrophilic capping agent being of the following formula:

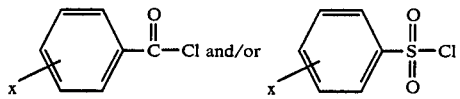

wherein x is halogen, alkyl, alkoxy, nitro,

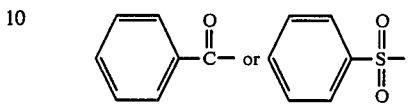

9. A method for stabilizing a poly(aryl ether ketone) producing by reacting diphenyl ether with terephthaloyl chloride and/or esophthaloyl chloride under heterogeneous polymerization conditions in the presence of a Friedel-Crafts catalyst at a temperature of from about 0° to about 30° C. in a solvent comprising 1,2-dichloroethane, which comprises adding a nucleophilic and/or an electrophilic capping agent during the polymerization, said nucleophilic capping agent being of the following formula:

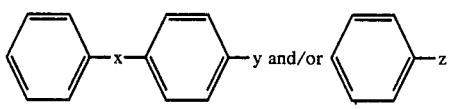

wherein x is a covalent bond, —O—, —S—, or —CR$_2$—, wherein each R is independently hydrogen, C$_1$ to C$_{10}$ alkyl, C$_1$ to C$_{10}$ fluoroalkyl, phenyl or an electron withdrawing group substituted phenyl, y is NO$_2$,

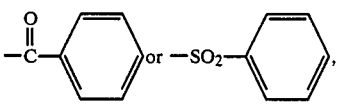

and z is halogen, alkyl or alkoxy; said electrophilic capping agent being of the following formula:

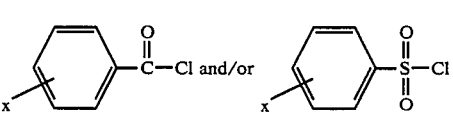

wherein x is halogen, alkyl, alkoxy, nitro,

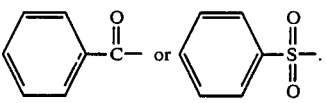

* * * * *